United States Patent
Zante

(10) Patent No.: US 8,621,792 B2
(45) Date of Patent: Jan. 7, 2014

(54) FLEXIBLE CLAMPS FOR CLAMPING PANELS

(76) Inventor: Anthony A. Zante, Fremont, CA (US)

(*) Notice: Subject to any disclaimer, the term of this patent is extended or adjusted under 35 U.S.C. 154(b) by 0 days.

(21) Appl. No.: 12/638,864

(22) Filed: Dec. 15, 2009

(65) Prior Publication Data

US 2010/0146899 A1     Jun. 17, 2010

(51) Int. Cl.
*E04D 13/18* (2006.01)
(52) U.S. Cl.
USPC .............. 52/173.3; 52/599; 52/584.1
(58) Field of Classification Search
USPC ........... 52/543, 546, 547, 548, 549, 689, 699, 52/700, 704, 173.3, 460, 471, 47, 2, 582.1, 52/584.1, 586.1, 586.2, 585.1; 411/34, 35; 403/373, 374, 277
See application file for complete search history.

(56) References Cited

U.S. PATENT DOCUMENTS

| | | | | |
|---|---|---|---|---|
| 2,317,428 A * | 4/1943 | Anderson | ................ | 52/509 |
| 2,490,663 A * | 12/1949 | Van Uum et al. | ................ | 52/460 |
| 3,276,800 A * | 10/1966 | Loudon et al. | ................ | 403/397 |
| 6,672,018 B2 * | 1/2004 | Shingleton | ................ | 52/173.3 |
| 7,194,844 B2 * | 3/2007 | Dennis | ................ | 52/582.1 |
| 7,434,362 B2 * | 10/2008 | Liebendorfer | ................ | 52/173.3 |

* cited by examiner

*Primary Examiner* — Jessica Laux
(74) *Attorney, Agent, or Firm* — GSS Law Group

(57) ABSTRACT

A flexible height-adjustable clamp for clamping a solar panel to a support structure or base, with flat surfaces on the upper and lower parts of the clamp, the upper section clamping on the panels; and the lower section mounting against the base; with a hole through both flat surfaces for bolting a connector through the surfaces to secure the clamp and panel to the supporting structure; and a flexible section connecting the two surfaces in the form of an arc or folded section; with mechanical stops to allow positioning to against said panel.

6 Claims, 5 Drawing Sheets

Figure 5A:
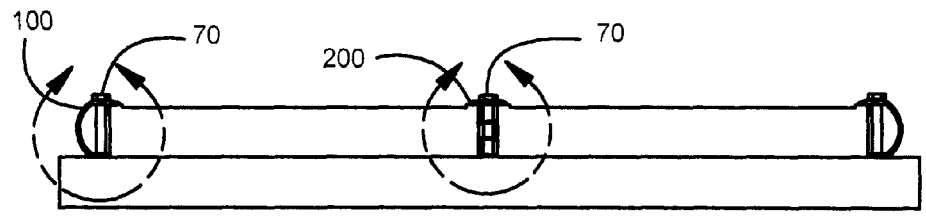

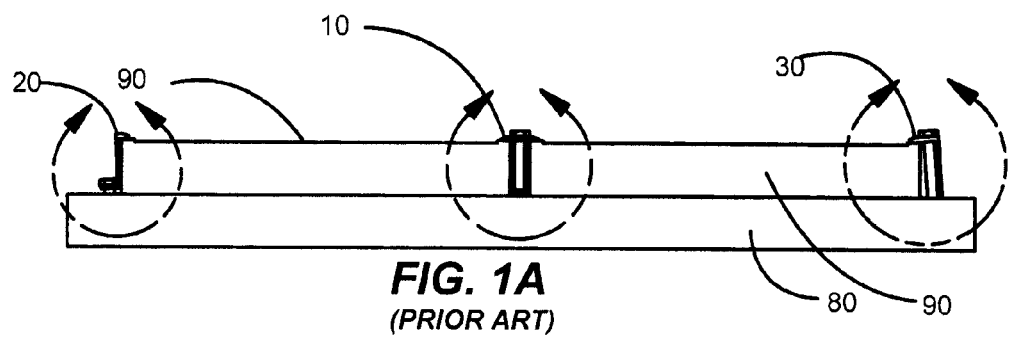
FIG. 1A
*(PRIOR ART)*
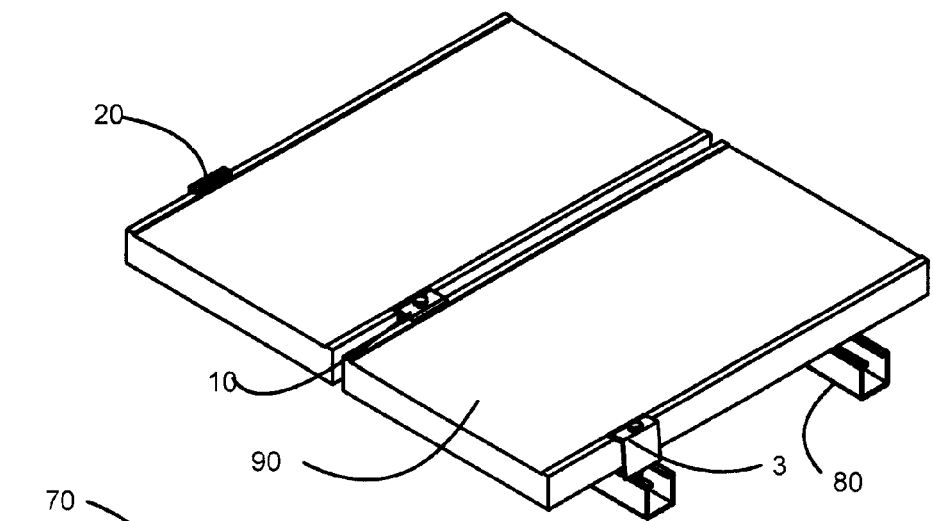
FIG. 1B
*(PRIOR ART)*
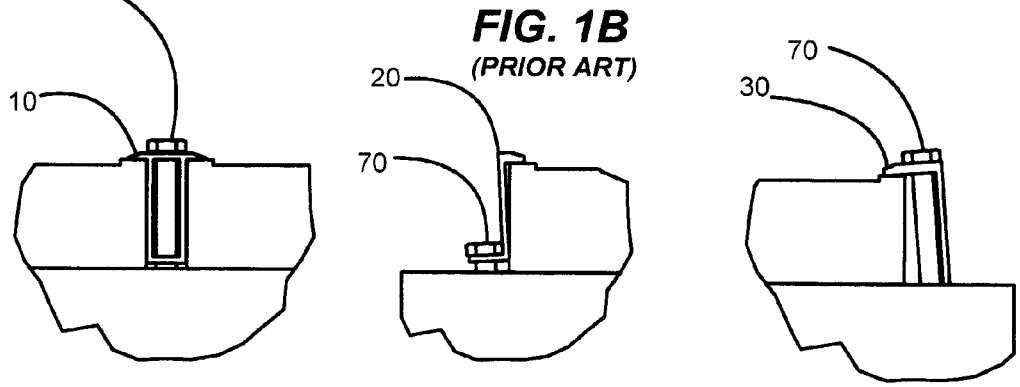
FIG. 2
*(PRIOR ART)*
FIG. 3
*(PRIOR ART)*
FIG. 4
*(PRIOR ART)*

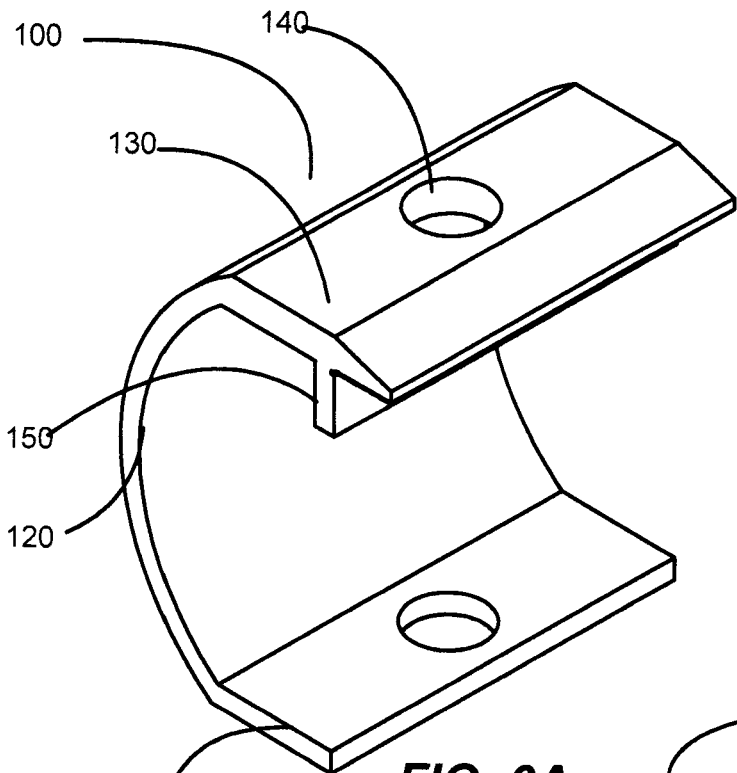
FIG. 6A
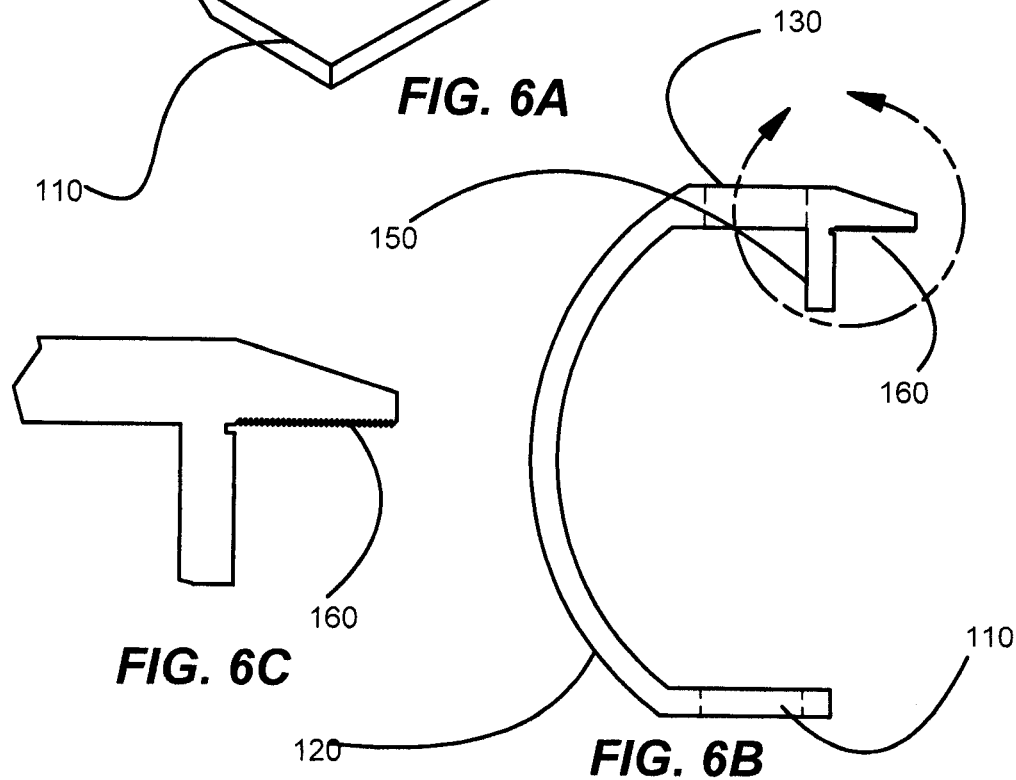
FIG. 6C
FIG. 6B

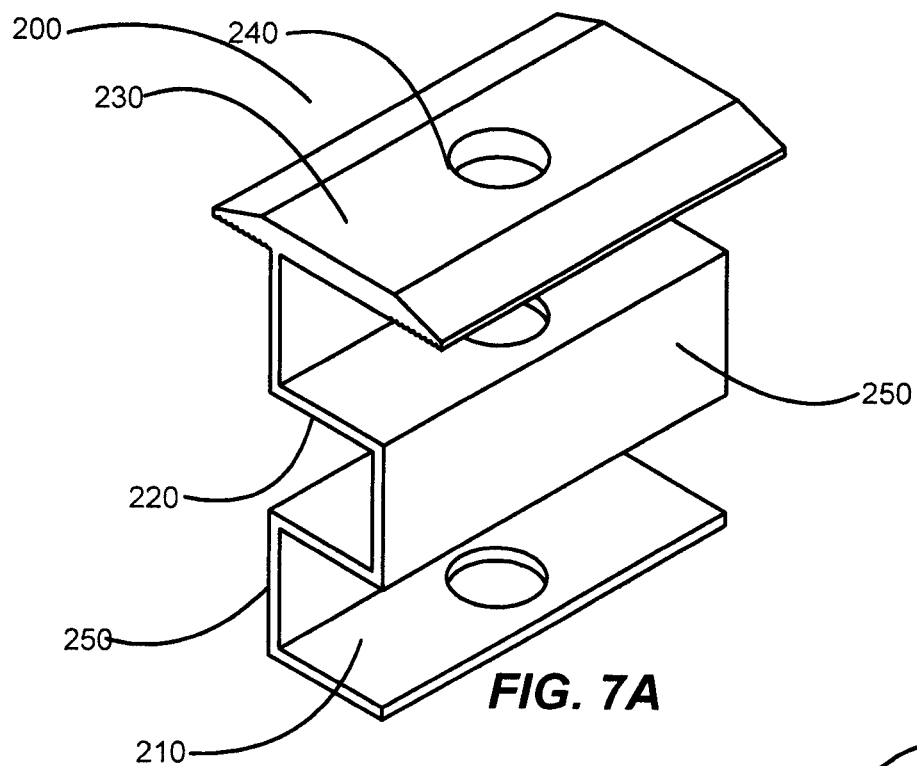
FIG. 7A
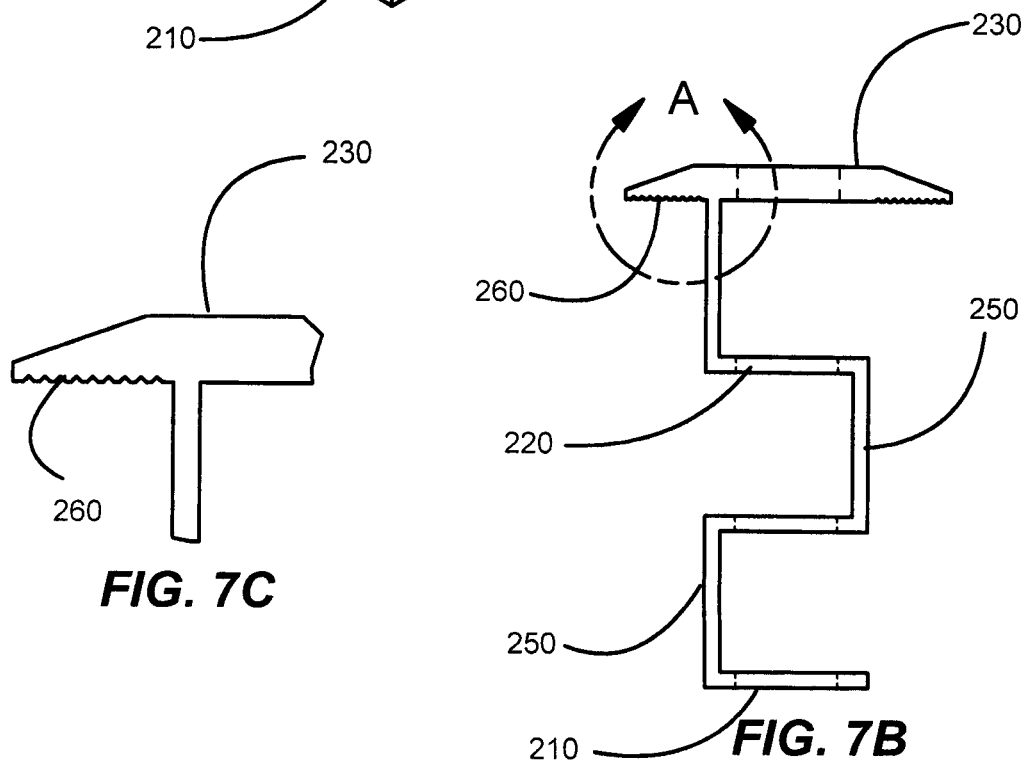
FIG. 7C
FIG. 7B

FLEXIBLE CLAMPS FOR CLAMPING PANELS

CROSS-REFERENCE TO RELATED APPLICATIONS

This application claims the benefit of provisional patent application Ser. No. 61/138,052 filed Dec. 16, 2008 by the present inventor.

BACKGROUND OF THE INVENTION

1. Field of Invention

This invention relates to a clamping system incorporating flexible clamps or clips for securing photovoltaic modules, panels, and plates against support structures and frames.

2. Prior Art

Generally solar photo voltaic (PV) modules are attached to support frames mounted on rooftops, poles, and other surfaces with various means of clamping techniques. These clamping methods must provide sufficient force to insure that the modules will remain in place against their associated support frames even under very high wind loads. Examples of prior art are shown in FIGS. 1-4.

Typical clamping methods utilize various forms of edge holding clamps that clamp on top of the panel and hold the panel against a base or structural member using a bolt or screw for attachment. The structural member is typically a rail style member such as a commercial strut channel. FIG. 1 illustrates typical clamps for clamping solar panels to strut bases.

Currently there are many forms of clamps that are used for panel or plate clamping applications. For clamping two panels adjacent to each other with a common clamp there are two popular configurations: the T-clamp (FIG. 2) or flanged U-clamp that grips two adjacent panel edges and clamps them to a common strut channel. U.S. Pat. No. 6,672,018 describes the T-clamp and its clamping method. Typically the clamp is made shorter than the height of the panels in order to insure proper clamping action. The major problem with this type of apparatus is that since it is shorter than the panel that it is clamping, it will not stay in place and will fall off of the edge if only one panel is present. The second adjacent panel must be put in position first so that the T-clamp or U-clamp can be supported by both panel edges. Unfortunately this limits its usefulness since panels are typically installed in sequence. And since they are typically installed on an inclined surface such as a roof, it is difficult for a single installer to temporarily hold the first panel in position and simultaneously bring the second panel into position for clamping.

T-clamps and U-clamps can be made longer than the part that they must clamp, however they still will not clamp the first panel in place without large forces needed to overcome their stiffness. These clamps are therefore also difficult to use for this application.

Currently there are other types of clamps that are used for clamping a single panel edge into place. One of the most popular types of clamps for this application is the Z-clamp (FIG. 3). The Z-clamp grips the top of the module with its upper lip and clamps to the strut channel using a bolt through the lower lip of the clamp. It is typically made intentionally short to insure gripping. Unfortunately this method of clamping with an intentionally short clamp has a tendency to pivot or slip away from the panel module edge causing loss of clamping force and consequent panel disengagement. Also, since the panel height varies, the height of the clamp must also vary in order to meet the appropriate height requirement. This leads to the need for a number of different height clamps because they have no adjustability. It is also difficult to uniformly clamp the panel into place because of the need for intentionally shorter Z-clamps.

An L-clamp (FIG. 4) forming an inverted L shape when clamped against the panel can also be used for clamping the panels in place. However, unless it is made exactly the correct height it will create an uneven force on the panels causing stress concentrations and slippage toward or away from the panels.

Although there are many conventional clamps for clamping PV modules and panels to structures they all suffer from the following disadvantages:

Existing T-clamps and U-clamps that are shorter than the panel height tend to slip or fall off of the initial panel if not held in place before the adjacent panel can be positioned next to it. This increases the assembly labor because the clamp must be temporarily held in place until the next panel is positioned next to it.

Existing T-clamps and U-clamps that are longer than the panels also suffer from their limited usefulness in clamping the first panel.

Because of the solar panel thickness tolerances, existing Z-clamps and other end clamps are constructed intentionally shorter to insure proper gripping. However bolting down the base causes the top edge to slip away from the panel edge while tightening (See FIG. 3).

Existing end clamps do not squarely clamp the panel edge and can create stress concentrations on the outer panel edges when tightened.

In summary there is a need for flexible height clamps that can provide sufficient clamping force without causing slippage or stress concentrations on the devices being clamped.

3. Objects and Advantages

The present invention is a flexible clamp that is formed to provide the flexibility needed to clamp variable height panels or flat surfaces. The clamp is tightened against the panel with a bolt through the clamp. The clamp configuration for the required deflection path is in the form of an arch or C, rectangle, or other folded shape. An important feature of the clamp shape is the ability to apply asymmetric deflection and consequent forces against the components to be clamped.

There are a number of objects and advantages of this invention over existing clamping systems.

The tolerance in the height of the solar panel is no longer critical for proper clamping because the clamp's inherent flexibility allows height variations.

Unlike most solar clamps the pivot point for tightening is located above and outside the clamp tightening bolt. This means that as bolt tightening proceeds the clamp rotates towards the panel instead of away from it insuring positive contact.

When clamping two panels with this clamp the first panel can be secured by initial tightening and it still allows the second panel to be inserted under the clamp flange to be tightened.

Because of its flexibility the clamp's bearing surface adjusts angularly to the panel surface angle and provides more uniform loading—compared with Z-clamps that provide little or no flexibility and instead create corner stress concentrations.

The flexible configuration of the clamp allows it to act as a stiff hinge and provide a relatively constant force to the panel even when temperature changes or stresses cause slight thickness changes in the solar panel.

The flexible clamp when formed into an undulating profile allows it to be used in tight spaces and still retain its flexibility.

The flexible clamp properties allow it to withstand the dynamic loads and vibrations associated with solar panels subject to high wind loads and solar tracking.

Further objects and advantages will become apparent from a consideration of the drawings and ensuing description.

SUMMARY

In accordance with the present invention a flexible height adjustable clamp comprises flat horizontal surfaces on the top and bottom with flexible material between the two flat surfaces joining them together. The joining point to each horizontal surface is asymmetrically positioned to effect angular and downward movement of the top flat surface relative to the bottom flat surface. A hole through the top and bottom surfaces allows for a bolt to be installed and provide the force necessary to effect the downward and angular movement clamping the panels in place.

A flexible height-adjustable clamp for clamping a solar panel to a support structure or base, with flat surfaces on the upper and lower parts of the clamp, the upper section clamping on the panels; and the lower section mounting against the base; with a hole through both flat surfaces for bolting a connector through the surfaces to secure the clamp and panel to the supporting structure; and a flexible section connecting the two surfaces in the form of an arc or folded section; with mechanical stops to allow positioning to against said panel. The flexible section may be asymmetrically positioned to cause the clamp to apply a horizontal force as well as vertical force against the panel. The bolt may be positioned between the flex section and the panel. The flex section may be sufficiently stiff to provide reaction loading of the panel to the required force. The clamping section may have serrations on the clamping surface to prevent slippage. The clamp may be formed by extrusion. The clamp may be forged. The clamp may be manufactured in more than one part. The flex section may be configured in a narrow profile to fit between two panels and clamp said panels using a single bolt connection. The flex section may be asymmetrically positioned to allow initial clamping of the first panel before said clamp secures the second panel. The flex section may be sufficiently flexible to allow for greater height adjustability. The flex section may be in the form of a circle, oval, rectangle, or folded pattern.

FIG. 1A shows a side view of the prior art clamps in their assembled positions

Figure 5C:
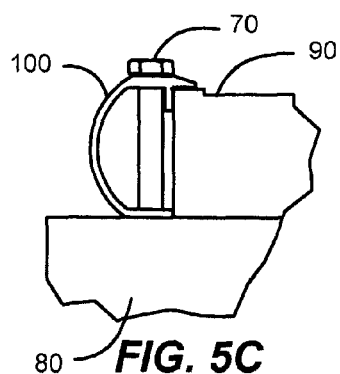
Figure 5D:
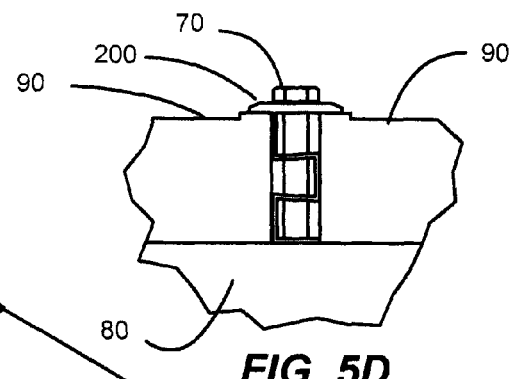
Figure 5B:
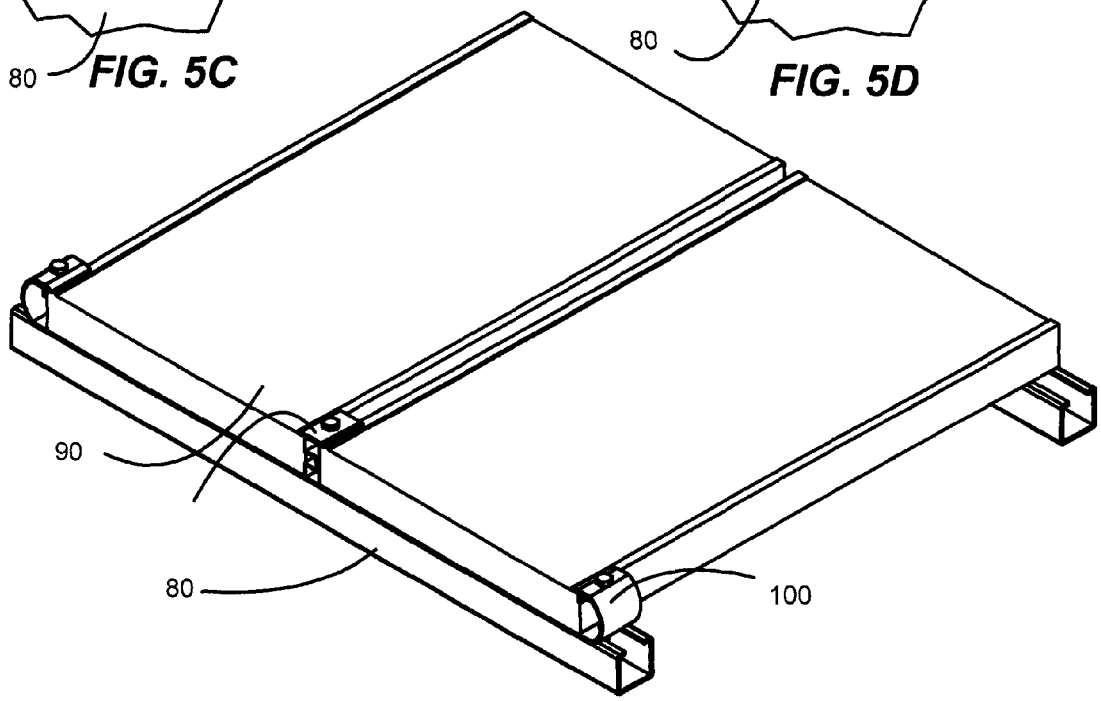
Figure 8A:
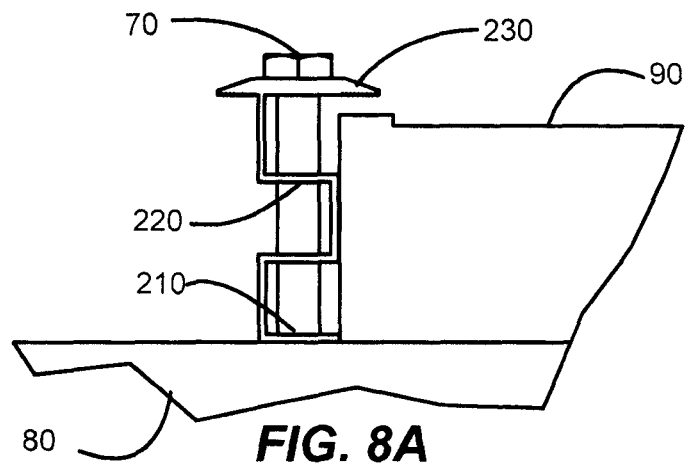
Figure 8B:
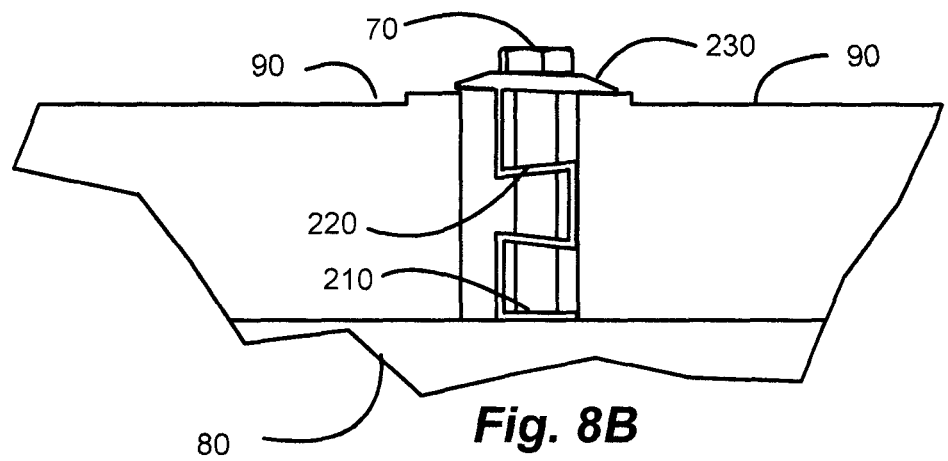
Figure 8C:
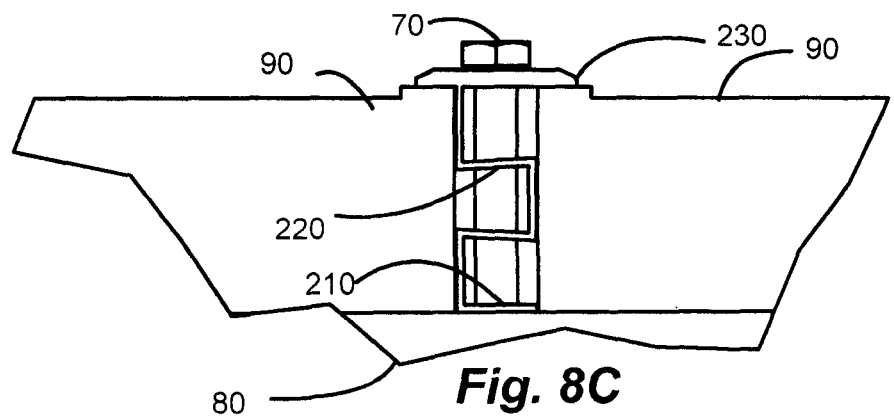

FIG. 1B shows a perspective view of the prior art clamps in their assembled positions FIG. 2 shows a view of the prior art T-clamp detail FIG. 3 shows a view of the prior art Z-clamp detail FIG. 4 shows a view of the prior art L-clamp detail FIG. 5A shows a side view of the flexible clamps in their assembled positions FIG. 5B shows a perspective view of the flexible clamps in their assembled positions FIG. 5C shows a side view of the flexible C-clamp assembly detail FIG. 5D shows a side view of the flexible folding clamp assembly detail FIG. 6A shows a perspective view of the flexible C-clamp FIG. 6B shows a side view of the flexible C-clamp FIG. 6C shows a detail view of the flexible C-clamp serrated surface FIG. 7A shows a perspective view of the flexible folded clamp FIG. 7B shows a side view of the flexible folded clamp FIG. 7C shows a detail view of the flexible folded clamp serrated surface FIG. 8A shows a view of the flexible folded clamp prior to tightening FIG. 8B shows a view of the flexible folded clamp clamping the first panel FIG. 8C shows a view of the flexible folded clamp clamping both panels

DRAWINGS

Reference Numerals

| | |
|---|---|
| 10 | T-clamp |
| 20 | Z-clamp |
| 30 | L-clamp |
| 70 | mounting bolt |
| 80 | mounting base |
| 90 | solar panel |
| 100 | flexible C-clamp |
| 110 | C-clamp mounting base |
| 120 | C-clamp arched wall |
| 130 | C-clamp clamping section |
| 140 | C-clamp bolt hole |
| 150 | C-clamp mechanical stop |
| 160 | C-clamp serrated surface |
| 200 | flexible folded clamp |
| 210 | folded clamp mounting base |
| 220 | folded clamp folded wall |
| 230 | folded clamp clamping section |
| 240 | folded clamp bolt hole |
| 250 | folded clamp mechanical stop |
| 260 | folded clamp serrated surface |

DETAILED DESCRIPTION

The mounting method and use of the flexible clamps is illustrated in FIGS. 5A, 5B, 5C, and 5D. In FIGS. 5A and 5B the flexible C-clamp 100 is shown mounted on the panel 90 outside edges and the flexible folded clamp 200 is shown between two said panels. Because of the available space on the outside edges of said panels there is sufficient space for the C-clamps to be used for clamping. Said C-clamps have a relatively stiff arched wall 120 to provide sufficient clamping force to hold said panels in place. The available space between the panels is smaller and therefore a different configuration of clamp is required. In this case the panels are clamped with said flexible folded clamps since they have a smaller width profile. Said folded clamps have a thinner folded wall 220 to allow sufficient flexibility for mounting said panels. There is less strength necessary in the folded wall because said panel edges react against the forces exerted by the mounting bolt 70.

The details of this flexible C-clamp are illustrated in FIGS. 6A, 6B, and 6C. The bottom or base 110 of the clamp is flat and mounts directly to the strut mounting base 80 that also supports the panel. The curved wall 120 provides the flexing portion of the clamp. In the embodiment shown said curve wall is typically a thin metal that is 1 to 3 mm thick. The thicker clamping section 130 is used to clamp down against the top of said panel. The mounting hole 40 is used to bolt the clamp with the panel under the clamping section to the strut. The panel stop 50 is used to prevent the clamp from slipping too far onto one of the panels. Other embodiments may be either thinner or thicker depending on the gripping height required to match the particular solar panel. Thicker walls may be required for taller clamps and thinner walls required for shorter clamps. The wall thickness is further dependent on the material used. Aluminum flexes more easily and allows use of a thicker wall than steel. Plastic and composites may also be used for this particular embodiment dependent on the forces required.

The arched shape allows the C-clamp to lean toward the panel insuring positive engagement. Other asymmetric shapes also provide the same function including rectangular C shapes and other polygonal C shapes. As the clamp leans toward the panel while tightening, the mechanical stop 50 provides positive positioning of the C-clamp. Serrations 60 in the gripping portion of the clamp minimize the possibility of slippage between the panel and the clamp.

FIG. 5 shows the clamp bolted to the mounting base 80 supported by the arched wall 120 on the outside and supported by the panel edge on the other side thereby clamping the panel against the mounting support. When the bolt is tightened the clamp pivots from the heel of its base 110, through its arched wall and imparts a downward force on the panel and a horizontal force towards the panel causing a compressive horizontal force against the panel thereby preventing slip. The curved wall thickness is designed to impart the force necessary for the item that must be clamped. This particular force is dependent on the weight of the items being clamped in place, wind loads, and other static and dynamic loads that may be applied to the panel.

A second embodiment of clamp is illustrated in FIG. 7. In this particular embodiment the clamp is constructed in a folded form that allows it to fit between two adjacent panels and still maintain its flexibility. This particular embodiment is shown in the form of an E or S. The folded surfaces that are in the vertical position are the mechanical stops 250 that position the panels relative to the clamp as well as to each other. Bolt hole 240 passes directly through the top clamping surface 230, folded surfaces 220, and base 210 into the structural support. Other folded or undulating profiles are also possible for said mechanical stops as long as they maintain sufficient flexibility. The combinations are mainly dependent on the wall thickness, flexible section length, and materials used. In this embodiment there are two relatively thicker clamping surfaces 230 that clamp directly on top of the adjacent panel edge horizontal surfaces. Said clamping surfaces generally create a grip height to the bottom base 210 that is slightly taller than the panel so that the panel can easily slide under said clamping surfaces. The asymmetric connection from said clamping surfaces to the folded flex section 220 provides the functionality needed for sequential clamping of two adjacent panels. FIG. 5 shows the assembly with the flexible E or S shaped clamp mounted to the support and clamped to the panels. FIGS. 8A, 8B, and 8C illustrate the sequence of assembly for solar panels on an incline. The normal sequence consists of first positioning the clamp so that 220 to 230 joint is farthest away from the first panel to be clamped. The bolt 70 is then tightened which initially draws the open clamping section 230 against and towards the first panel, temporarily holding the first panel in position. The flanged face is tightened down against this first panel with the second clamping section face still raised to accept the second panel. The second adjacent panel is then slid under the second clamping section. The bolt connecting the flexible clamping section to the panel surface is then tightened causing the clamp to deflect downward onto the second panel surface. The clamp is then tightened to the required torque for securing both panels into position.

For both of the embodiments described above the clamping mechanism utilizes an anchor nut that is mounted in the support structure or strut. This anchor nut is generally prevented from rotating therefore allowing the bolt to tighten into this restrained nut allowing the clamp to be forced against the support or strut. This anchor nut or strut nut typically slides in a slot within the strut or support where the panel is supported.

Thus the reader will see that the flexible clamp provides a highly reliable, labor saving, yet economical device that has a wide range of usage. While my above description contains many specificities these should not be construed as limitations on the scope of the invention, but rather as an exemplification of one preferred embodiment thereof. Many other variations are possible.

The clamping plate and flex section may be two separate components that are fitted together to function as a flexible clamp. For example the C shaped section can be a formed spring steel component that is fitted to the clamping flange. This allows more flexibility so that the same clamp can be used for clamping a wider variety of panel thicknesses.

A further embodiment would incorporate the anchor nut that is typically mounted into the support strut as part of the clamp. This anchor nut can either be forged or extruded with the clamp or be subsequently attached after fabrication. In this particular case the clamp is slid into the strut with the nut sliding inside the strut housing.

Accordingly, the scope of the invention should be determined not by the embodiments illustrated, but by the appended claims and their legal equivalents.

I claim:

1. A height-adjustable clamp for clamping a solar panel to a support structure, comprising:
   a clamping section comprising:
   a clamping surface formed with a through-hole;
   a first end; and
   a second end opposite said first end along a longest edge of said clamping surface;
   a mounting base comprising;
   a bottom surface formed with a through-hole;
   a longest side perpendicular to said bottom surface and having an edge in common with said bottom surface, wherein said bottom surface and said clamping surface are separated by a distance greater than a thickness dimension of the solar panel;
   a panel stop extending from said clamping surface toward said mounting base said panel stop having a surface extending from said first end to said second end of said clamping section and said surface on said panel stop coplanar with said longest side of said mounting base; and
   a flexible arched wall joining said mounting base to said clamping section, said arched wall extending from said first end to said second end of said clamping section with said arched wall disposed outside a gap between said clamping surface and said mounting base, wherein said through-holes in said mounting base and said clamping section are unthreaded and aligned with one another for passage of a bolt through both through-holes.

2. The height-adjustable clamp of claim 1 wherein said clamp is formed by extrusion.

3. The height-adjustable clamp of claim 1 wherein said clamp is forged.

4. The height-adjustable clamp of claim 1 wherein said clamp is manufactured in more than one part.

5. An apparatus for clamping more than one solar panel to a support structure, comprising:
   a first clamp, comprising:
   a clamping section comprising:
   a clamping surface formed with a through-hole and a first gripping surface;
   a first end; and a second end opposite said first end along a longest edge of said clamping surface;

a mounting base comprising:
  a bottom surface formed with a through-hole; and
  a longest side perpendicular to said bottom surface and having an edge in common with said bottom surface;

a panel stop extending from said clamping surface toward said mounting base, said panel stop having a surface extending from said first end to said second end of said clamping section and said surface on said panel stop coplanar with said longest side of said mounting base; and a flexible arched wall joining said mounting base to said clamping section, said arched wall extending from said first end to said second end of said clamping section with an outer surface of said arched wall disposed entirely outside a gap between said clamping surface and said mounting base, wherein said through-holes in said clamping section and said mounting base are unthreaded and aligned with one another; and a second clamp for clamping two adjacent solar panels, comprising:
  a clamping section comprising:
    a clamping surface for clamping against the solar panel, said clamping surface formed with a through-hole and a first gripping surface;
    a first end; and
    a second end opposite said first end of said clamping surface;
  a mounting base comprising:
    a bottom surface formed with a through-hole; and
    a longest side having an edge in common with said bottom surface; and
  a flexible wall joining said mounting base to said clamping section, said flexible wall comprising a plurality of wall segments, each of said plurality of wall segments perpendicular to an adjacent wall segment and at least one of said plurality of wall segments having a surface coplanar with said longest side of said mounting base.

6. The apparatus of claim 5, wherein said clamping section in said second clamp further comprises a second gripping surface, and when a bolt is passed through said through hole in said clamping section and through said through-hole in said mounting base and attached to the support structure, said first gripping surface holds one solar panel to the support structure before said second gripping surface contacts an adjacent solar panel.

* * * * *